United States Patent
Alfoqaha

(10) Patent No.: US 7,199,974 B1
(45) Date of Patent: Apr. 3, 2007

(54) READ/WRITE HEAD WITH REDUCED POLE TIP PROTRUSION

(75) Inventor: Arshad A. Alfoqaha, San Jose, CA (US)

(73) Assignee: Western Digital (Fremont), Inc., Fremont, CA (US)

(*) Notice: Subject to any disclaimer, the term of this patent is extended or adjusted under 35 U.S.C. 154(b) by 492 days.

(21) Appl. No.: 10/771,054

(22) Filed: Feb. 2, 2004

(51) Int. Cl.
G11B 5/17 (2006.01)

(52) U.S. Cl. ........................ 360/126; 360/123

(58) Field of Classification Search ............. 360/126, 360/122, 123
See application file for complete search history.

(56) References Cited

U.S. PATENT DOCUMENTS

| | | | |
|---|---|---|---|
| 5,687,045 A * | 11/1997 | Okai et al. | 360/126 |
| 5,930,086 A * | 7/1999 | Chaug et al. | 360/313 |
| 6,381,094 B1 * | 4/2002 | Gill | 360/126 |
| 6,396,660 B1 * | 5/2002 | Jensen et al. | 360/126 |
| 6,661,621 B1 * | 12/2003 | Iitsuka | 360/317 |
| 6,754,050 B2 * | 6/2004 | Kong et al. | 360/317 |
| 6,760,191 B1 * | 7/2004 | Yan et al. | 360/128 |
| 6,842,308 B1 * | 1/2005 | Pust et al. | 360/234.7 |
| 6,859,343 B1 * | 2/2005 | Alfoqaha et al. | 360/126 |
| 6,876,526 B2 * | 4/2005 | Macken et al. | 360/324.12 |
| 6,894,871 B2 * | 5/2005 | Alfoqaha et al. | 360/126 |
| 6,909,578 B1 * | 6/2005 | Missell et al. | 360/126 |
| 6,914,750 B2 * | 7/2005 | Garfunkel et al. | 360/234.3 |
| 6,989,963 B2 * | 1/2006 | Kautzky et al. | 360/126 |
| 7,035,046 B1 * | 4/2006 | Young et al. | 360/126 |
| 7,079,353 B2 * | 7/2006 | Hsiao et al. | 360/123 |
| 7,092,208 B2 * | 8/2006 | Zou et al. | 360/128 |
| 7,102,853 B2 * | 9/2006 | Macken et al. | 360/126 |
| 2001/0043446 A1 * | 11/2001 | Barlow et al. | 360/319 |
| 2002/0067571 A1 * | 6/2002 | Yoshida et al. | 360/126 |
| 2003/0048579 A1 * | 3/2003 | Kikuchi et al. | 360/123 |
| 2004/0027717 A1 * | 2/2004 | Alfoqaha et al. | 360/126 |
| 2004/0075944 A1 * | 4/2004 | Macken et al. | 360/126 |
| 2004/0252396 A1 * | 12/2004 | Pleiss | 360/55 |
| 2005/0225897 A1 * | 10/2005 | Liu et al. | 360/126 |
| 2006/0102956 A1 * | 5/2006 | Kamarajugadda et al. | 257/359 |

* cited by examiner

Primary Examiner—Brian E. Miller
(74) Attorney, Agent, or Firm—Sam Kassatly, Esq.

(57) ABSTRACT

A write element for use in a read/write head having an air bearing surface, so as to reduce pole tip protrusion. The write element includes a pole tip region; an insulation layer formed adjacent to the pole tip region; a coil embedded in the insulation layer which contributes to a protrusion force that generates a pole tip protrusion; and a layer of thermally expansive material formed over the insulation layer, and recessed from the air bearing surface, that expands in response to heat absorption, causing a rotational moment of force that counteracts the protrusion force thus reducing the pole tip protrusion.

20 Claims, 11 Drawing Sheets

READ/WRITE HEAD WITH REDUCED POLE TIP PROTRUSION

FIELD OF THE INVENTION

The present invention generally relates to data storage devices such as disk drives, and it particularly relates to a read/write head for use in such data storage devices. More specifically, the present invention provides a method of incorporating a layer of expansive material in the read/write head to counteract the forces that cause undesirable pole tip protrusion of the read/write head during operation.

BACKGROUND OF THE INVENTION

An exemplary conventional read/write head comprises a thin film write element with a bottom pole P1 and a top pole P2. The pole P1 has a pole tip height dimension commonly referenced as "throat height". In a finished write element, the throat height is measured between the ABS and a zero throat level where the pole tip of the write element transitions to a back region. The ABS is formed by lapping and polishing the pole tip. A pole tip region is defined as the region between the ABS and the zero throat level. Similarly, the pole P2 has a pole tip height dimension commonly referred to as "nose length". In a finished read/write head, the nose is defined as the region of the pole P2 between the ABS and the "flare position" where the pole tip transitions to a back region.

Pole P1 and pole P2 each have a pole tip located in the pole tip region. The tip regions of pole P1 and pole P2 are separated by a recording gap that is a thin layer of non-magnetic material. During a write operation, the magnetic field generated by pole P1 channels the magnetic flux from pole P1 to pole P2 through an intermediary magnetic disk, thereby causing the digital data to be recorded onto the magnetic disk.

During operation of the magnetic read/write head, the magnetic read/write head portion is typically subjected to various thermal sources that adversely cause ambient and localized heating effects of the read/write head. One such thermal source is attributed to a heat transfer process to the magnetic read/write head from the effect of the spinning magnetic disk.

During a typical operation, the magnetic disk spins at a rapid rate of rotation, typically on the order of several thousands of revolutions per minute (RPM). This rapid rotation generates a source of friction in the ambient air between the ABS and the spinning magnetic disk, thus causing an elevation in the air temperature.

Furthermore, the heating of the motor that drives the magnetic disk causes an additional elevation of the air temperature. In totality, the ambient air temperature may rise from a room temperature of about 25° C. to as high as 85° C. Typically, the read/write head is initially at a room temperature. Consequently, there exists a tendency for a heat transfer process to take place between the ambient air at a higher temperature and the read/write head at lower temperature. The heat transfer causes a rise in the temperature of the read/write head to promote a thermal equalization with the ambient air temperature.

Additionally, the read/write head is also subjected to various sources of power dissipation resulting from the current supplied to the write coils, eddy current in the core, and the current in the read sensor. The power dissipation manifests itself as a localized heating of the read/write head, resulting in a temperature rise similar to the foregoing ambient temperature effect.

The temperature increase of the read/write head further causes a variant temperature distribution as a result of the thermal conduction of diverse materials that compose the read/write head. Typically, most wafer-deposited materials such as those composing the poles P1 and P2 have greater coefficients of thermal expansion (CTE) than that of the substrate. Consequently, the temperature increase effects a general positive displacement of the read/write head as well as a local pole tip protrusion beyond the substrate.

In a static test environment without the effect of the spinning magnetic disk, the localized heating may cause a temperature elevation of as high as 70° C. However, in an operating environment of a magnetic disk drive, the temperature rise resulting from the localized heating may be limited to about 40° C., primarily due to the alleviating effect of a convective heat transfer process induced by the rotating air between the pole tip region and the spinning magnetic disk. The temperature increase associated with the localized heating further promotes an additional protrusion of the pole tip relative to the substrate.

A typical pole tip protrusion in a static environment may be approximately 30 to 35 nm. In an operating environment of a magnetic disk drive, the pole tip protrusion is reduced to a typical value of 7.5 nm to 12 nm. Since a typical flying height is approximately 12.5 nm, the pole tip protrusion associated with thermal heating of the read/write head can cause the read/write head to come into contact with the spinning magnetic disk. While a typical flying height may be about 12.5 nm, there are currently a significant number of low flying heads with flying heights less than 12.5 nm. A steady evolution to lower flying heights exacerbates the problem of physical interference between the pole tip protrusion and the spinning magnetic disk.

This physical interference with the spinning magnetic disk causes both accelerated wear and performance degradation. The wear effect is due to abrasive contact between the slider and the disk. Pulling the softly sprung slider slightly off track impacts the track following capability of the recording device.

In an attempt to resolve the foregoing problem, a number of conventional designs of read/write heads incorporate the use of a material with a coefficient of thermal expansion (CTE) that is lower than that of the substrate. Functionally, the low CTE material is generally used as an insulator between various metals in a conventional magnetic read/write head. An exemplary material used in a conventional magnetic read/write head is silicon oxide, $SiO_2$, which typically has a CTE of 2 parts per million.

In the presence of a temperature rise resulting from a thermal heating of the read/write head, such a material tends to expand at a lower rate than the substrate. This lower expansion rate develops a thermally induced axial restraining force between the material and the substrate. This restraining force effectively reduces the expansion of the substrate, thus mitigating the natural protrusion of the pole tip.

Although this technology has proven to be useful, it would be desirable to present additional improvements. $SiO_2$ has poor thermal conductivity that generally impedes the heat extraction process from the surrounding material to the $SiO_2$ material. Consequently, in spite of the low CTE associated with $SiO_2$, the low thermal conductivity of $SiO_2$ does not sufficiently reduce the temperature rise of the pole tip region and the pole tip protrusion is not adequately reduced with the use of $SiO_2$.

Furthermore, $SiO_2$ lacks elasticity due to its ceramic characteristics. In the presence of the thermally induced axial restraining force, a shear stress is developed at the interface of $SiO_2$ and the surrounding material. This shear stress tends to promote a delamination of the $SiO_2$ material, posing a reliability problem for the read/write head of a conventional design.

In recognition of the issues associated with the use of $SiO_2$ in a conventional read/write head, some alternative materials have been proposed but have not been entirely successfully applied to a read/write head. As an example, while these materials such as Cr, W, possess higher thermal conductivities than $SiO_2$, they are not readily available for deposition and patterning in a read/write head at a wafer-level process.

Thus, there is a need for a read/write head that provides a reduced pole tip protrusion resulting from a thermal heating of the magnetic read/write head during operation. The need for such a design has heretofore remained unsatisfied.

SUMMARY OF THE INVENTION

The present invention can be regarded as a read/write head for use in a data storage device to reduce pole tip protrusion. The read/write head includes an air bearing surface; a pole tip region; an insulation layer formed adjacent to the pole tip region; a coil embedded in the insulation layer contributing to a protrusion force that generates a pole tip protrusion; and a layer of thermally expansive material formed over the insulation layer, and recessed from the air bearing surface, that expands in response to heat absorption, causing a rotational moment of force that counteracts the protrusion force thus reducing the pole tip protrusion.

The present invention can also be regarded as a write element for use in a read/write head having an air bearing surface, so as to reduce pole tip protrusion. The write element includes a pole tip region; an insulation layer formed adjacent to the pole tip region; a coil embedded in the insulation layer which contributes to a protrusion force that generates a pole tip protrusion; and a layer of thermally expansive material formed over the insulation layer, and recessed from the air bearing surface, that expands in response to heat absorption, causing a rotational moment of force that counteracts the protrusion force thus reducing the pole tip protrusion.

The present invention can also be regarded as a disk drive that includes a base; a spindle motor attached to the base; a disk positioned on the spindle motor; and a head stack assembly that is coupled to the base. The head stack assembly includes an actuator body; an actuator arm cantilevered from the actuator body; and a read/write head that is coupled to the actuator arm. The read/write head includes an air bearing surface; a pole tip region; an insulation layer formed adjacent to the pole tip region; a coil embedded in the insulation layer which contributes to a protrusion force that generates a pole tip protrusion; and a layer of thermally expansive material formed over the insulation layer, and recessed from the air bearing surface, that expands in response to heat absorption, causing a rotational moment of force that counteracts the protrusion force thus reducing the pole tip protrusion.

DETAILED DESCRIPTION OF PREFERRED EMBODIMENTS

Figure 1:
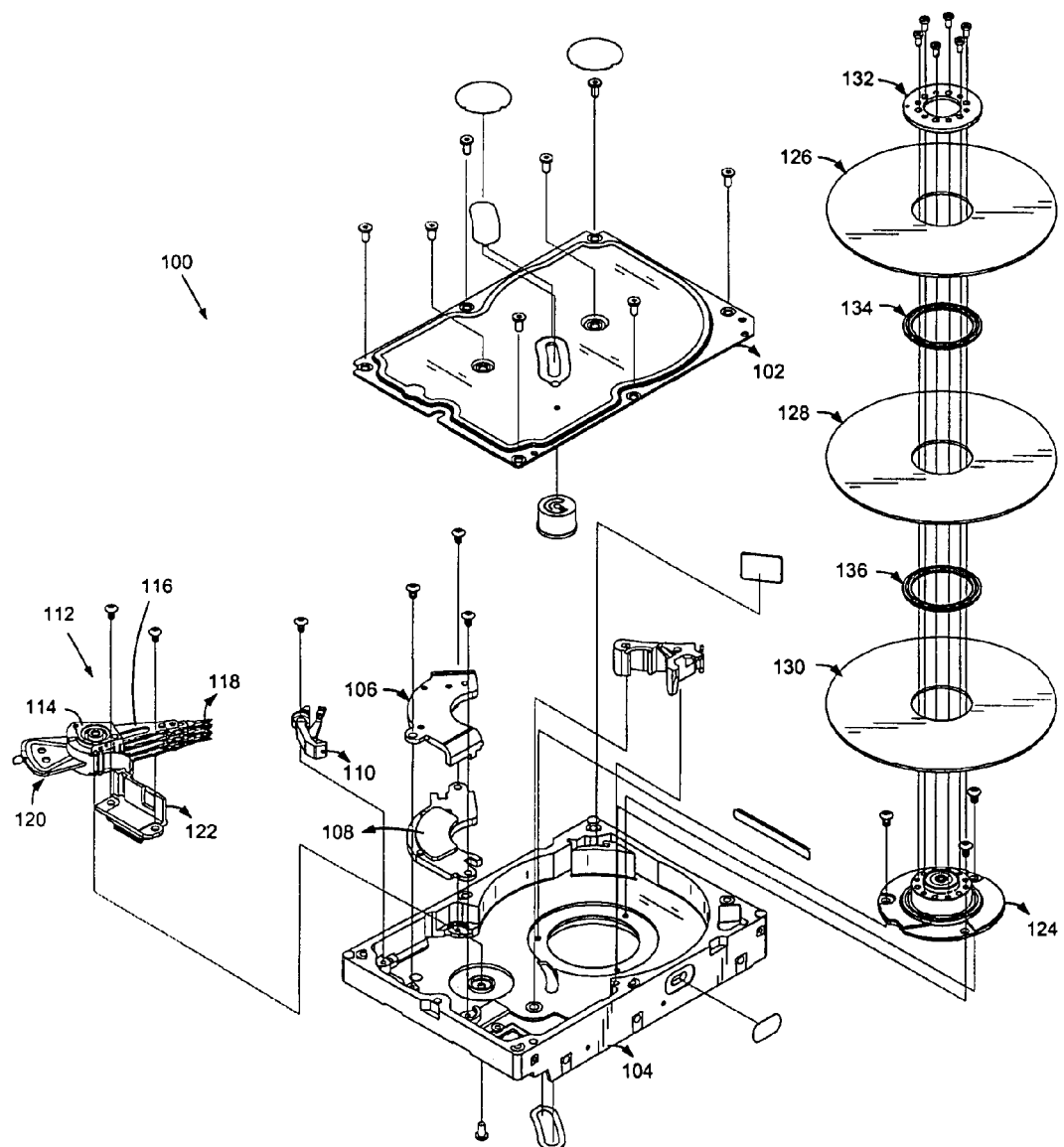
FIG. 1 is a fragmentary perspective view of a data storage device utilizing a read/write head of the present invention.

FIG. 1 illustrates a hard disk drive 100 in which an embodiment of the present invention may be used. An enclosure of the hard disk drive 100 comprises a cover 102 and a base 104. The enclosure is suitably sealed to provide a relatively contaminant-free interior for a head disk assembly (HDA) portion of the hard disk drive 100. The hard disk drive 100 also comprises a printed circuit board assembly (not shown) that is attached to base 104 and further comprises the circuitry for processing signals and controlling operations of the hard disk drive 100.

Within its interior, the hard disk drive 100 comprises a magnetic disk 126 having a recording surface typically on each side of the disk, and comprises a magnetic head or slider that may suitably be a magneto-resistive ("MR") head such as a GMR head. The GMR head has an MR element for reading stored data on a recording surface and an inductive element for writing data on the recording surface. The exemplary embodiment of the hard disk drive 100 illustrated in FIG. 1 comprises three magnetic disks 126, 128, and 130 providing six recording surfaces, and further comprises six magnetic heads.

Disk spacers such as spacers 134 and 136 are positioned between magnetic disks 126, 128, 130. A disk clamp 132 is used to clamp disks 126, 128, 130 on a spindle motor 124. In alternative embodiments, the hard disk drive 100 may comprise a different number of disks, such as one disk, two disks, and four disks and a corresponding number of magnetic heads for each embodiment. The hard disk drive 100 further comprises a magnetic latch 110 and a rotary actuator arrangement. The rotary actuator arrangement generally comprises a head stack assembly 112 and voice coil magnet ("VCM") assemblies 106 and 108. The spindle motor 124 causes each magnetic disk 126, 128, 130 positioned on the spindle motor 124 to spin, preferably at a constant angular velocity.

A rotary actuator arrangement provides for positioning a magnetic head over a selected area of a recording surface of a disk. Such a rotary actuator arrangement comprises a permanent-magnet arrangement generally including VCM assemblies 106, 108, and head stack assembly 112 coupled to base 104. A pivot bearing cartridge is installed in a bore of the head stack assembly 112 and comprises a stationary shaft secured to the enclosure to define an axis of rotation for the rotary actuator arrangement.

The head stack assembly 112 comprises a flex circuit assembly and a flex bracket 122. The head stack assembly 112 further comprises an actuator body 114, a plurality of actuator arms 116 cantilevered from the actuator body 114, a plurality of head gimbal assemblies 118 each respectively attached to an actuator arm 116, and a coil portion 120. The number of actuator arms 116 and head gimbal assemblies 118 is generally a function of the number of magnetic disks in a given hard disk drive 100.

Figure 2:
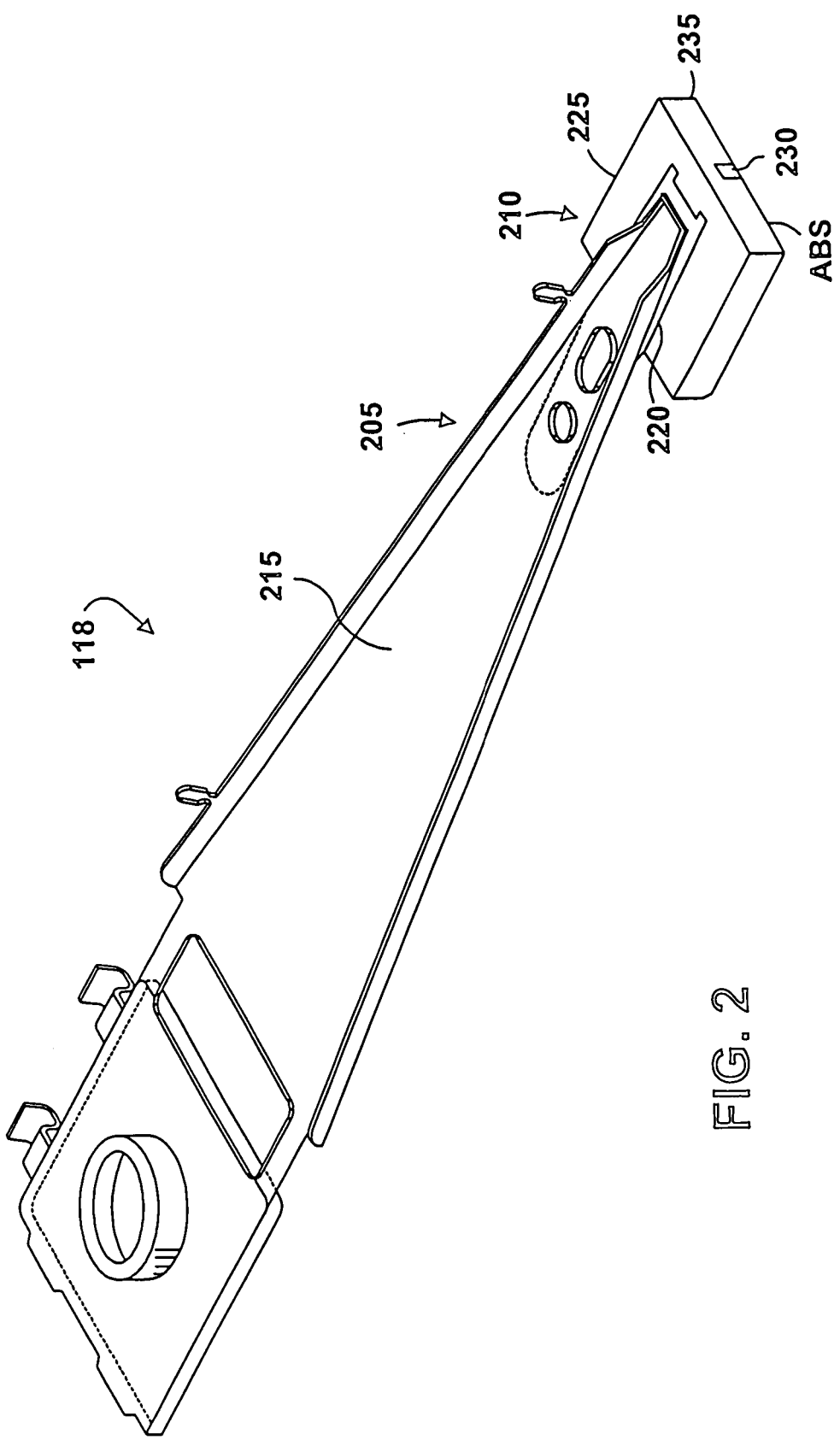
FIG. 2 is a perspective view of a head gimbal assembly comprised of a suspension, and a slider to which the read/write head of FIG. 1 is secured, for use in a head stack assembly.

Each of the head gimbal assemblies (HGA) 118 is secured to one of the actuator arms 116. As illustrated in FIG. 2, HGA 118 is comprised of a suspension 205 and a read/write head 210. The suspension 205 comprises a resilient load beam 215 and a flexure 220 to which the read/write head 210 is secured.

The read/write head 210 comprises a slider 225 secured to the free end of the resilient load beam 215 by means of flexure 220 and a read/write element 230 supported by slider 225. In the example illustrated in FIG. 2, the read/write element 230 is secured to the trailing edge 235 of slider 225. Slider 225 can be any conventional or available slider. In another embodiment, more than one read/write element 230 can be secured to the trailing edge 235 or other side(s) of slider 225.

Figure 3:
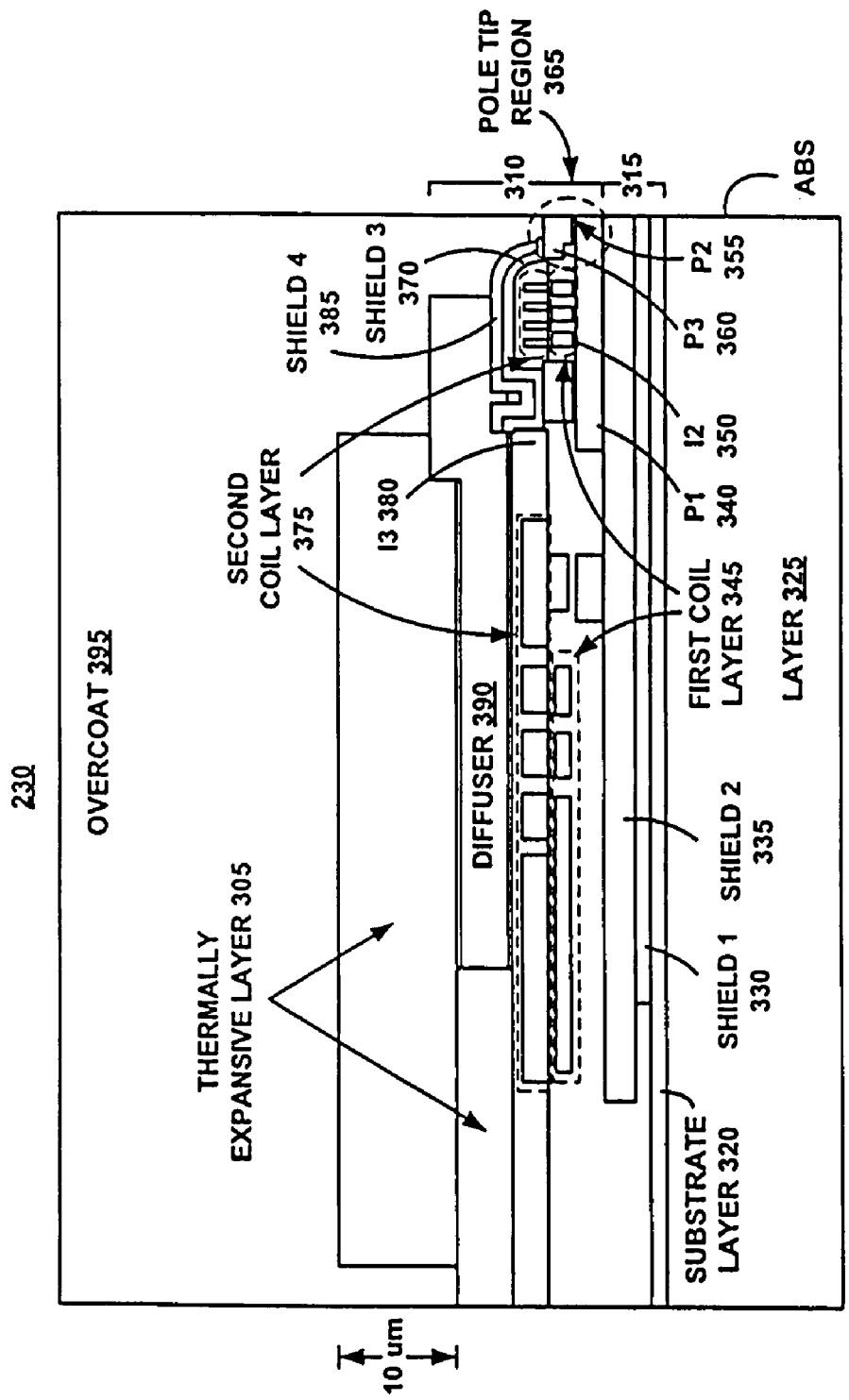
FIG. 3 is a cross-sectional view of the read/write head of FIGS. 1 and 2, illustrating the placement of a thermally expansive layer.

FIG. 3 is a cross-sectional view of the read/write element 230 incorporating a thermally expansive layer 305 that is comprised of thermally expansive material, according to the present invention. The read/write element 230 integrates a write element 310 and a read element 315. An undercoat 320 is formed over a substrate layer 325. The read element 315 is formed of a first shield layer (shield 1) 330 that is formed on the undercoat 320. The undercoat 320 is preferably made of alumina ($Al_2O_3$).

The first shield layer 330 is made of a material that is both magnetically and electrically conductive. As an example, the first shield layer 330 can have a nickel iron (NiFe) composition, such as Permalloy, or a ferromagnetic composition with high permeability. The thickness of the first shield layer 330 can be in the range of approximately 0.5 micron to approximately 20 microns.

An insulation layer (not shown) is formed over substantially the entire surface of the first shield layer 330 to define a non-magnetic, transducing read gap. The insulation layer can be made of any suitable material, for example alumina ($Al_2O_3$), aluminum oxide, or silicon nitride.

The read element 315 further comprises a second shield layer (shield 2) 335 that is made of an electrically and magnetically conductive material that may be similar or equivalent to that of the first shield layer 330. The second shield layer 335 is formed over substantially the entire surface of the insulating layer (not shown) and has a thickness that can be substantially similar or equivalent to that of the first shield layer 330. A piggyback gap (not shown) is formed on the second shield layer 335.

The write element 310 is comprised of a first pole or pole layer (P1) 340 that extends, for example, integrally from the piggyback gap. P1 340 is made of a magnetically conductive material. A first coil layer 345 comprises conductive coil elements. The first coil layer 345 also forms part of the write element 310, and is formed within an insulating layer (I2) 350. The first coil layer 345 may comprise a single layer of, for example, 1 to 30 turns, though a different number of turns can alternatively be selected depending on the application or design.

A second pole or pole layer (P2) 355 is made of a magnetically conductive material, and may be, for example, similar to that of the first shield layer 330 and P1 340. The thickness of P2 355 can be substantially the same as, or similar to, that of the first shield layer 330.

A third pole or pole layer (P3) 360 is made of a hard magnetic material with a high saturation magnetic moment Bs. In one embodiment, the saturation magnetic moment Bs is equal to or greater than approximately 2.0 teslas. P3 360 can be made, for example, of CoFeN, CoFeNi, and CoFe.

A pole tip region 365 comprises P3 360, P2 355, and the portion of P1 340 near the air bearing surface of the read/write element 230. The writing element 310 further comprises a third shield layer (shield 3) 370.

A second coil layer 375 comprises conductive coil elements. The second coil layer 375 forms part of the write element 310, and is formed within an insulating layer (I3) 380. The second coil layer 375 may comprise a single layer of, for example, 1 to 30 turns, though a different number of turns can alternatively be selected depending on the application or design.

A fourth shield layer (shield 4) 385 (also referred to as the upper shield 385) covers a portion of I3 380. A diffuser 390 covers a portion of the fourth shield layer 385 and a portion of I3 380.

In one embodiment, the thermally expansive layer 305 covers a portion of diffuser 390 and I3 380. An overcoat 395 covers the thermally expansive layer 305 and the remaining exposed portion of the read/write element 230.

The thermally expansive layer 305 is preferably comprised of a material having a coefficient of thermal expansion that ranges between approximately 5 ppm/K and 100 ppm/K. For example, the thermally expansive layer 305 can be made of photoresist material.

Figure 4:
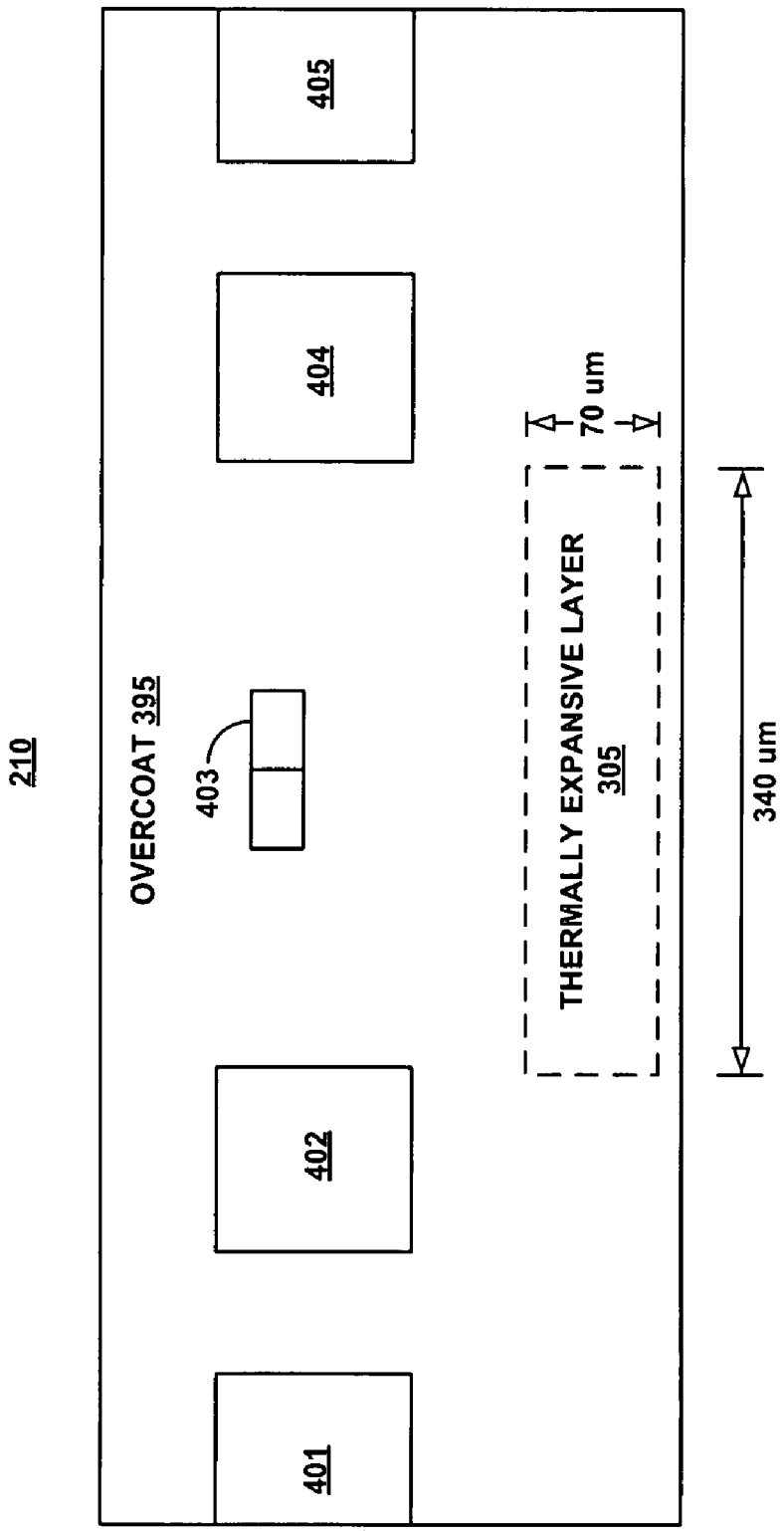
FIG. 4 is a top view of the read/write head of FIGS. 1, 2, and 3, further illustrating the placement of the thermally expansive layer.

The thermally expansive layer can be, for example, approximately 10 microns thick, 70 microns long, and 340 microns wide as illustrated by the top view of the read/write element 230, shown in FIG. 4 relative to pads 401, 402, 403, 404, and 405.

Figure 5:
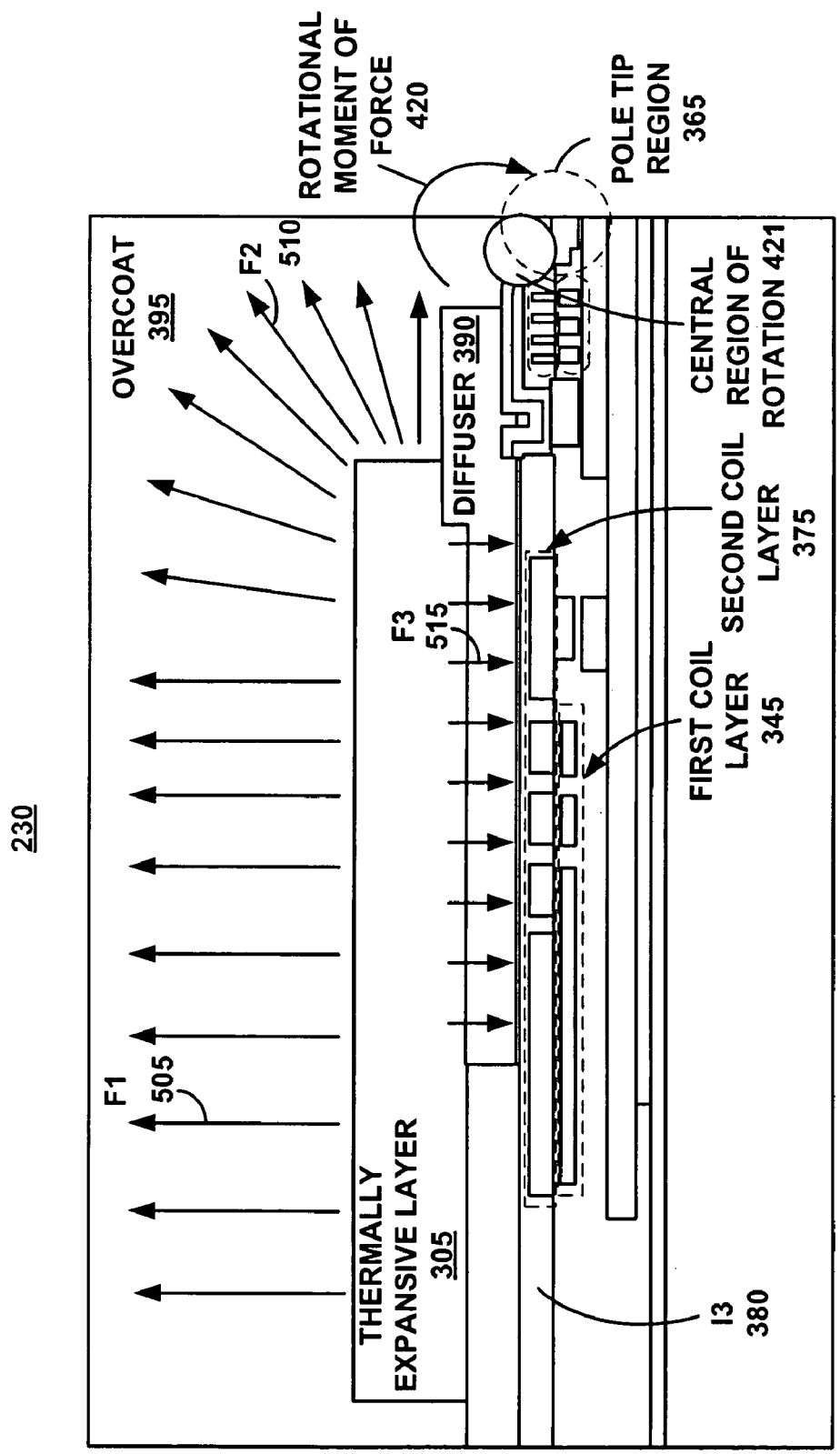
FIG. 5 is another view of the read/write head of FIG. 3 illustrating a rotational moment of force created by the thermally expansive layer to reduce pole tip protrusion.

FIG. 5 illustrates the forces generated by the expansion of the thermally expansive layer 305. During operation, the temperature of the read/write element 230 increases, resulting from ambient heating and current heating.

Current heating comprises resistive heating in the first coil layer 345 and in the second coil layer 375, and eddy currents in the magnetic materials of P1 340, P2 355, and P3 360. Ambient heating comprises friction heating of the air between the read/write head and the spinning magnetic disk, and heating from the drive motor of the data storage device.

The thermally expansive layer 305 absorbs a portion of the thermal energy in the read/write element 230, and consequently expands. The expansion of the thermally expansive layer 305 exerts forces that are illustrated by forces F1 505, F2 510, and F3 515.

Force F2 510 applies pressure to the overcoat 395, causing a clock-wise rotational moment of force 420 around a central region of rotation 421, near the pole tip region 365.

The rotational moment of force 420 counteracts a protrusion force in the pole tip region 365, reducing the pole tip protrusion. The size, shape, and placement of the thermally expansive layer 305 are designed to optimally place the rotational moment of force 420 so as to reduce pole tip protrusion. In addition, force F3 515 applies pressure to a portion of I3 380, limiting the expansion of I3 380.

Figure 6:
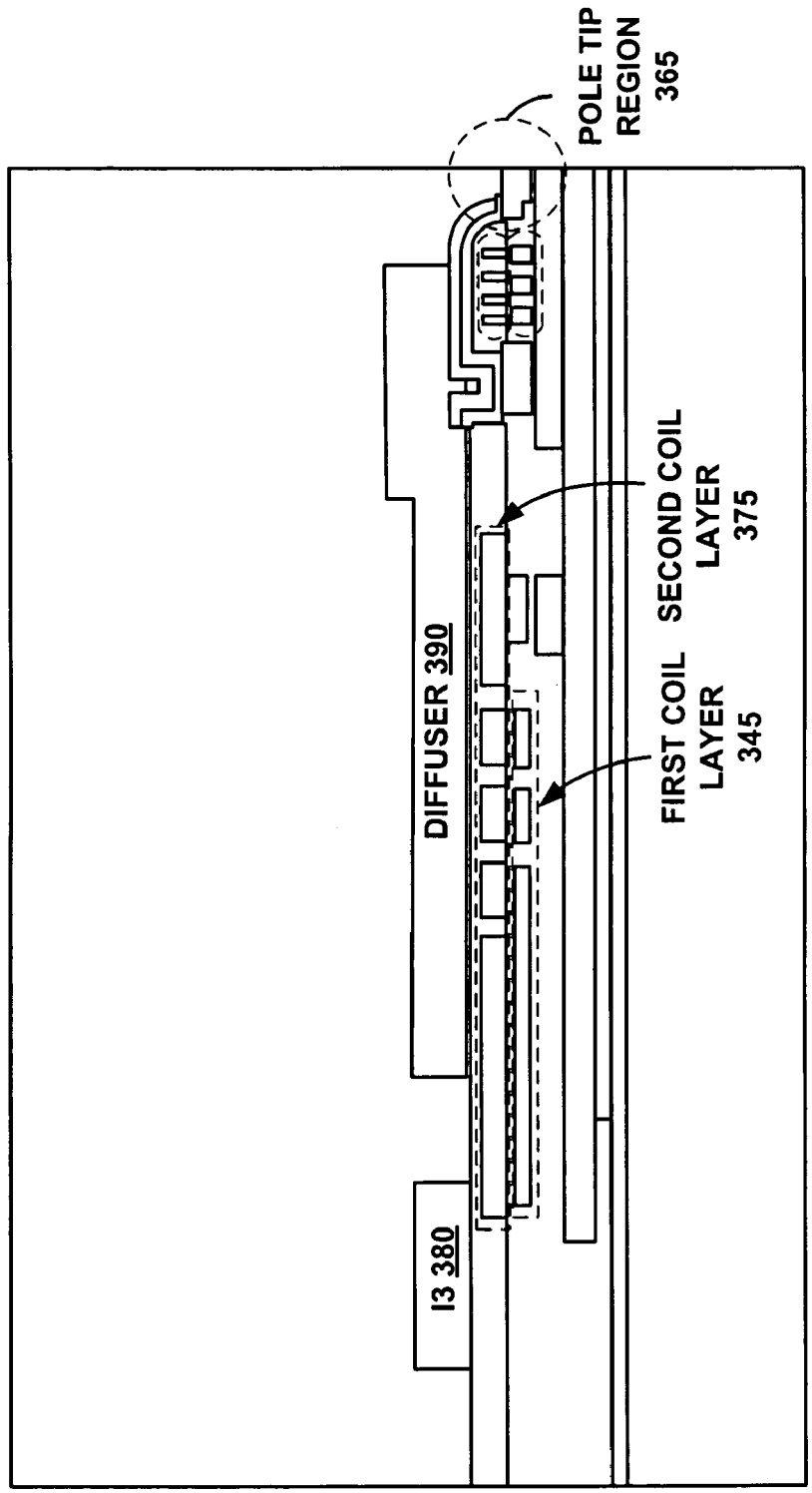
FIG. 6 is a cross-sectional view of a conventional read/write head.

For comparison purposes, a conventional read/write element 600 is illustrated by the diagram of FIG. 6. The conventional read/write element 600 is constructed generally similarly to the read/write element 230, but without the thermally expansive layer 305.

Figure 7:
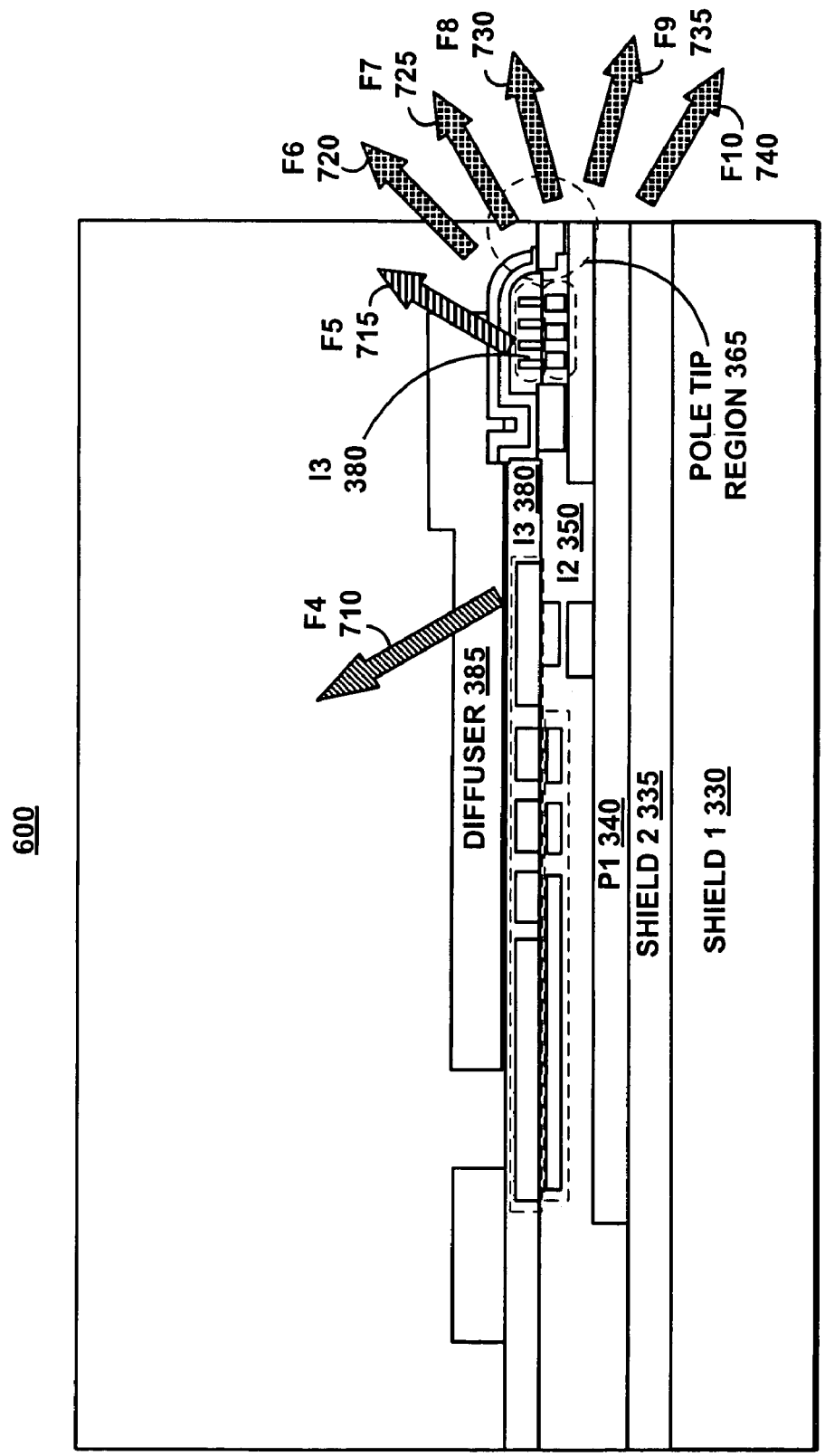
FIG. 7 is a force diagram of the conventional read/write head of FIG. 6 illustrating the forces that cause pole tip protrusion.

The force diagram of FIG. 7 illustrates the expansion forces induced in the conventional read/write element 600. The material used in I3 380 and I2 350 is typically thermally expansive. During operation, the temperature of I3 380 and I2 350 increases as a result of thermal transfer from the heat sources in the read/write element 230: the current heating and the ambient heating.

The resultant force created by the expansion of I3 380 and I2 350 can be characterized as forces F4 710, F5 715, F6 720, F7 725, F8 730, F9 735, and F10 740. Protrusion forces F6 720, F7 725, F8 730, F9 735, and F10 740 cause pole tip protrusion into the ABS.

Figure 8:
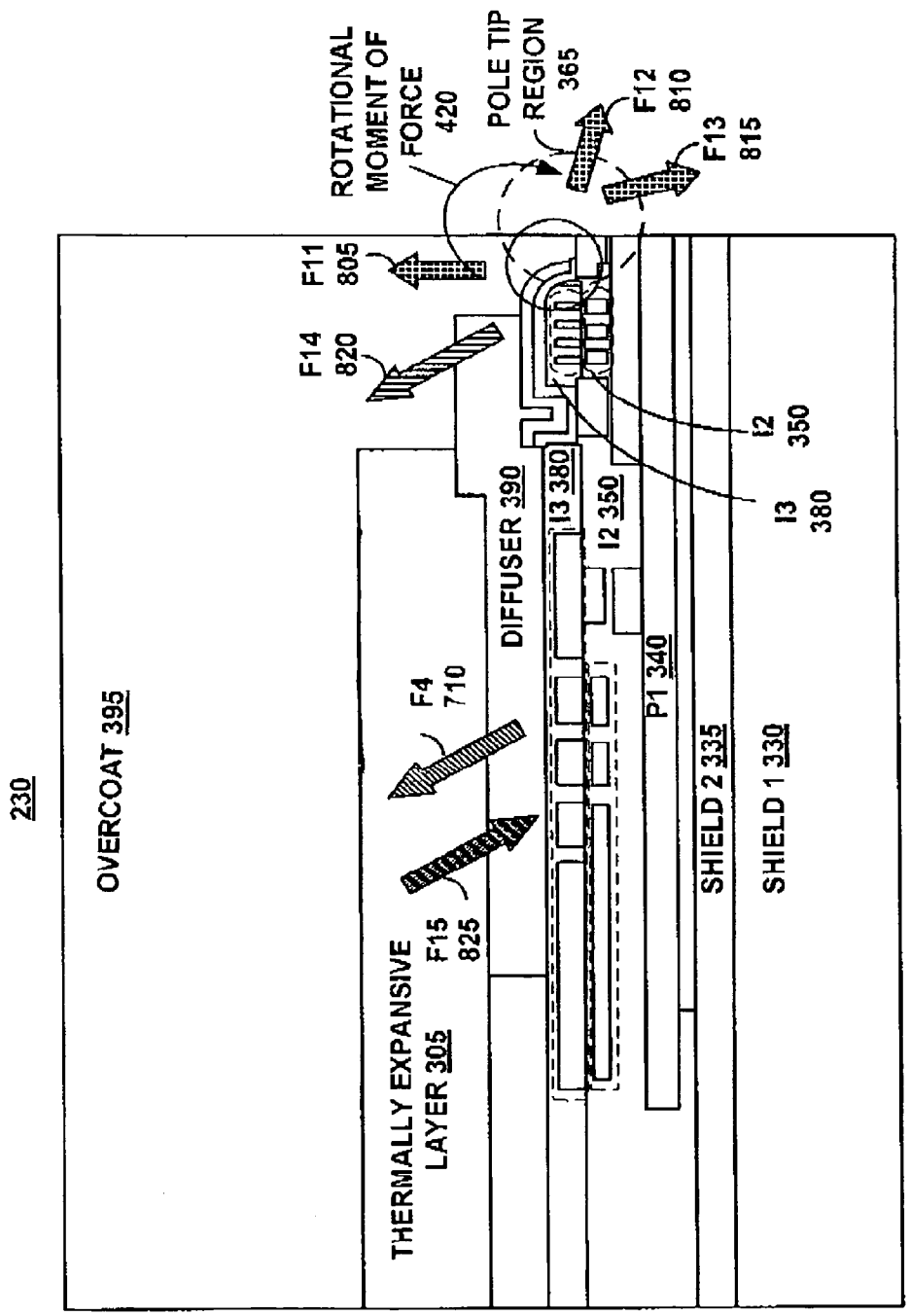
FIG. 8 is a force diagram of the read/write head of FIG. 5 illustrating the reduction in pole tip protrusion induced by a rotational moment of force resulting from the expansion of the thermally expansive layer of FIG. 4.

The force diagram of FIG. 8 illustrates the effect of adding the thermally expansive layer 305 to the read/write element 230. The resultant forces created by the expansion of the thermally expansive layer 305, I3 380, and I2 350 can be characterized as forces F11 805, F12 810, F13 815, F14 820, and F15 825. The forces F1 505, F2 510, and F3 515 (of FIG. 5) exerted by the thermally expansive layer 305 counteract and redirect the forces exerted by I3 380 and I2 350.

The rotational moment of force 420 created by the forces F1 505, F2 510, and F3 515, which are exerted by the thermally expansive layer 305, redirect the protrusion forces, as illustrated by reduced protrusion forces F11 805, F12, 810, and F13, 815. Rather than pushing the pole tip region 365 into the ABS, the direction of the forces F11 805 and F13 815 is generally along (or parallel to) the ABS, reducing the protrusion forces F11 805, F12, 810, and F13, 815. The rotational moment of force 420 also changes the direction of force F5 715 to that of force F14 820. Force F4 710 is counteracted by force F15 825 that is created by the thermally expansive layer 305, thus reducing the expansion of I3 380.

Figure 9:
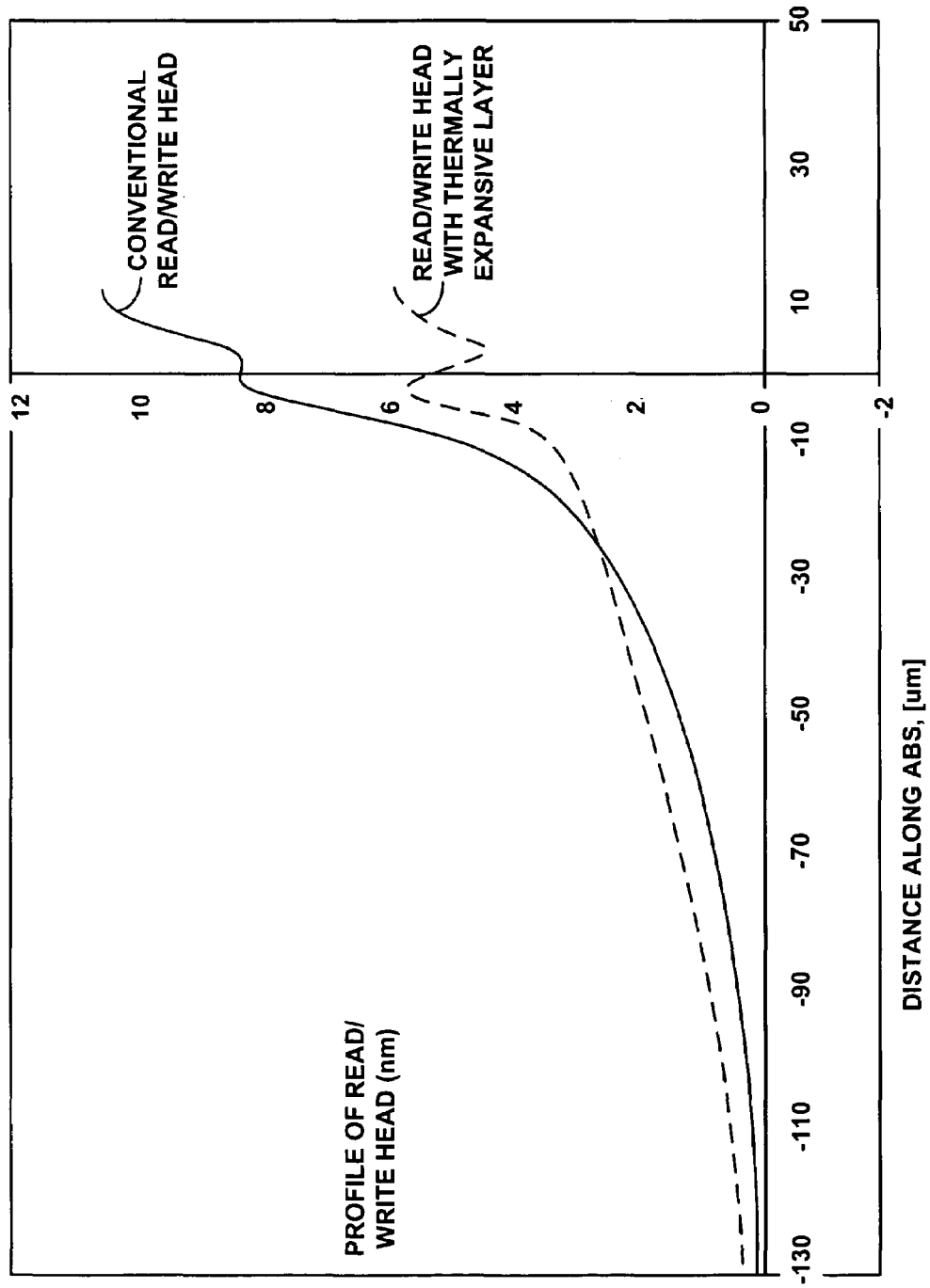
FIG. 9 is a graph comparing the pole tip protrusion of the conventional read/write head of FIG. 6 with that of the read/write head of FIG. 3, in response to ambient heating.
Figure 10:
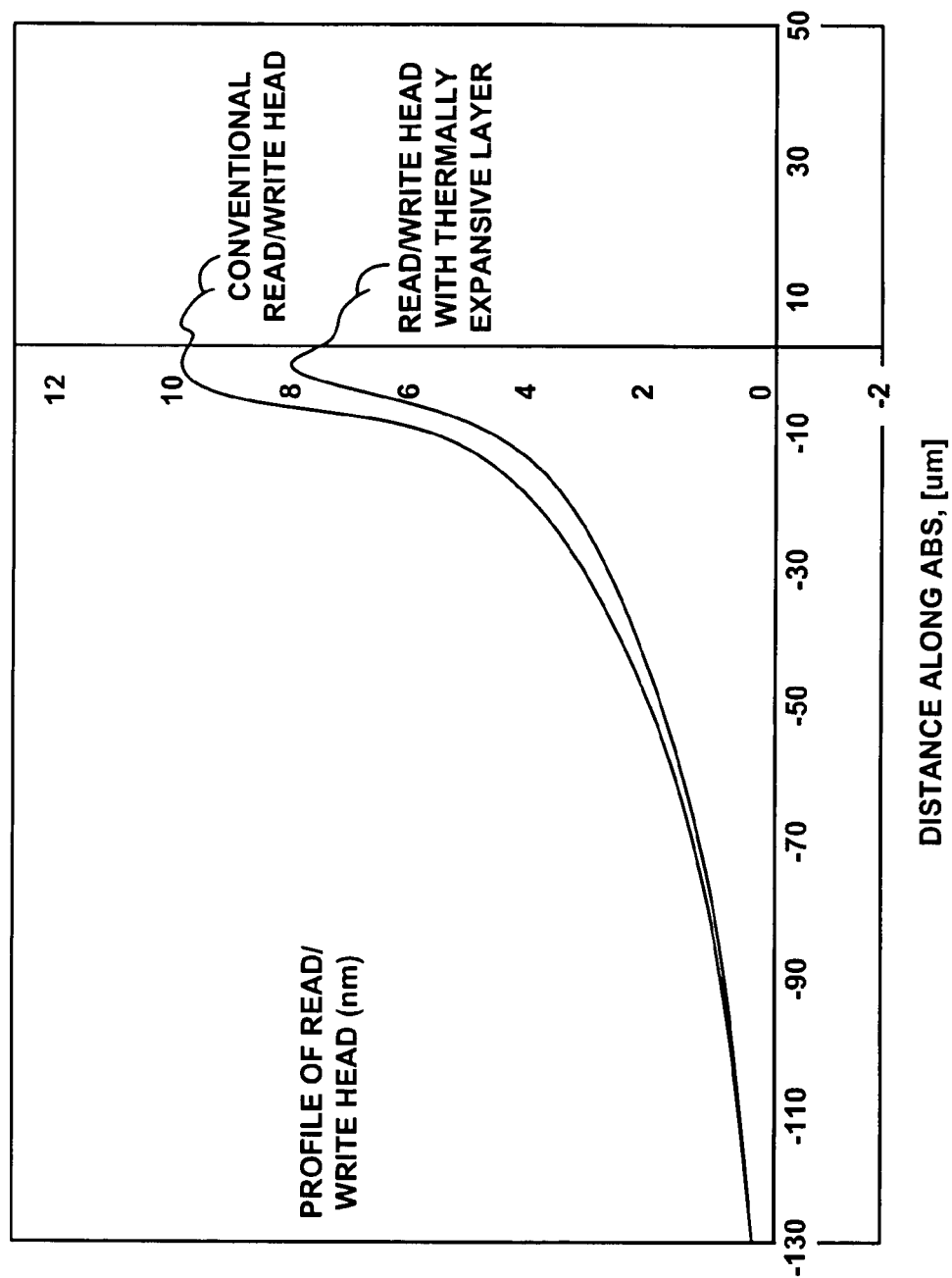
FIG. 10 is a graph comparing the pole tip protrusion of the conventional read/write head of FIG. 6 with that of the read/write head of FIG. 3 in response to current heating.

The effect of the thermally expansive layer 305 on pole tip protrusion is further illustrated by the graphs of pole tip protrusion shown in FIGS. 9 and 10. The x-axis corresponds to the ABS surface. The zero point on the x-axis corresponds to a write gap of the read/write element 230 or the conventional read/write element 600. The write gap is located between P1 and P2. The heat source for the graph of FIG. 9 is ambient heating. The heat source for the graph of FIG. 10 is current heating.

As shown in FIG. 9, the pole tip protrusion of the conventional read/write element 600 at the write gap is approximately 8.5 nm due to ambient heating. In contrast, the pole tip protrusion of the read/write element 230 of the present design, incorporating the thermally expansive layer 305, is less than approximately 6 nm, that is a reduction in pole tip protrusion of approximately 45%.

As further illustrated in FIG. 10, the pole tip protrusion of the conventional read/write element 600 at the write gap is approximately 10 nm due to current heating. In contrast, the pole tip protrusion of the read/write element 230 having a thermally expansive layer 305 is less than approximately 8 nm, that is a reduction in pole tip protrusion of approximately 20%.

Figure 11:
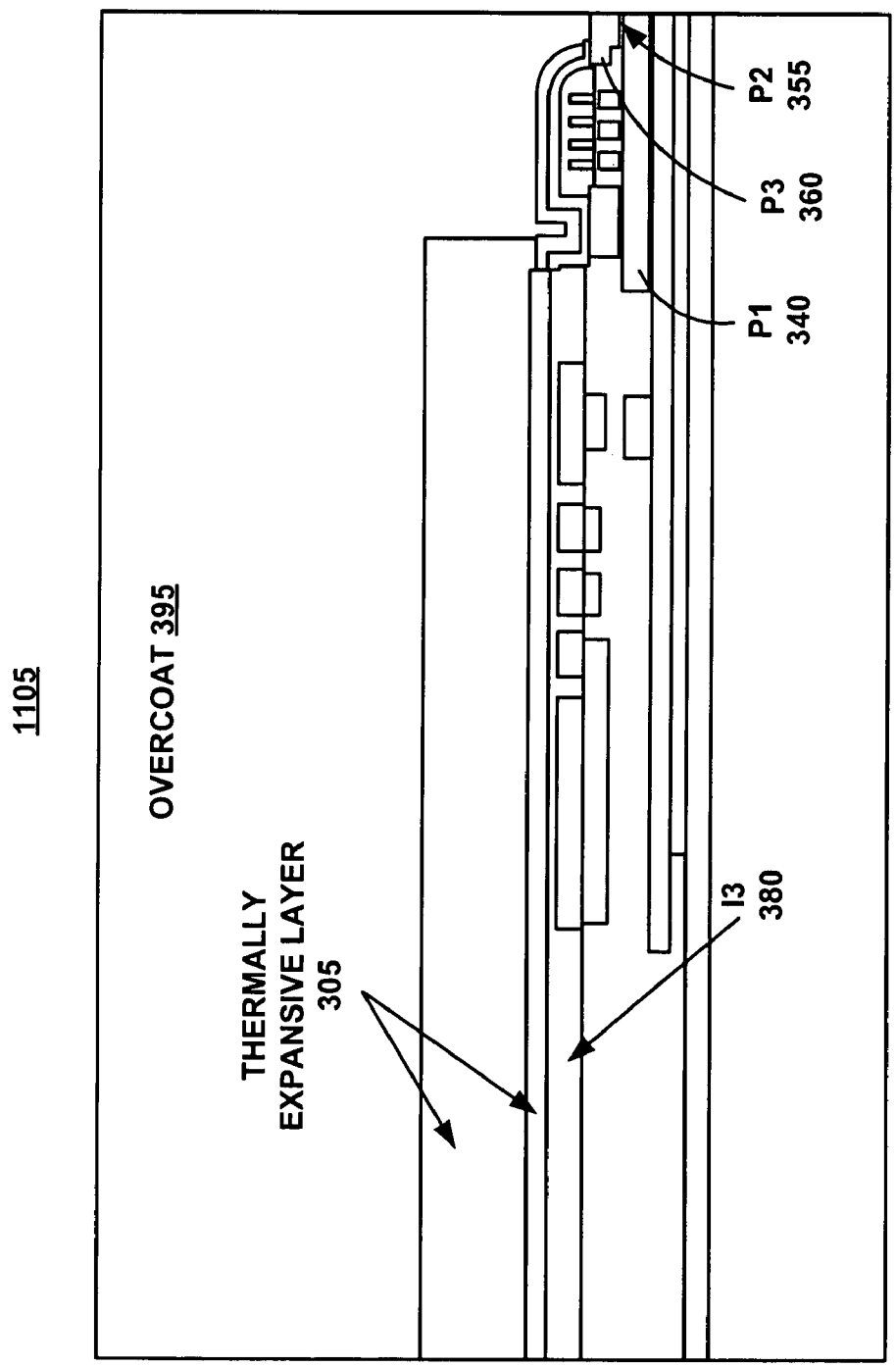
FIG. 11 is a cross-sectional of a read/write head that does not utilize a diffuser, illustrating the placement of a thermally expansive layer.

In a further embodiment illustrated by the diagram of FIG. 11, the thermally expansive layer 305 may be used in a read/write element 1105 that does not comprise a diffuser. In this embodiment, the thermally expansive layer 305 is placed in the range of approximately 0 um to approximately 1.0 um above poles P1 340, P2 355, and P3 360, primarily over layer I3 355. An overcoat 395 covers the thermally expansive layer 305 and the remaining exposed portion of the read/write element 1105.

What is claimed is:

1. A read/write head for use in a data storage device to reduce pole tip protrusion, comprising:
    an air bearing surface;
    a pole tip region;
    an insulation layer formed adjacent to the pole tip region;
    a coil embedded in the insulation layer contributing to a protrusion force that generates a pole tip protrusion; and
    a layer of thermally expansive material formed over the insulation layer, and recessed from the air bearing surface, that expands in response to heat absorption, causing a rotational moment of force that counteracts the protrusion force thus reducing the pole tip protrusion.

2. The read/write head of claim 1, wherein the layer of thermally expansive material is made at least in part of photoresist material.

3. The read/write head of claim 1, wherein the layer of thermally expansive material has a coefficient of thermal expansion that ranges between approximately 5 ppm/K and 100 ppm/K.

4. The read/write head of claim 1, further comprising a write element; and
    wherein the layer of thermally expansive material is formed over substantially the entire surface of the write element.

5. The read/write head of claim 4, further comprising a diffuser formed on top of the insulation layer; and
    wherein the layer of thermally expansive material is formed over the diffuser.

6. The read/write head of claim 5, wherein the diffuser is formed over substantially the entire surface of the write element.

7. The read/write head of claim 5, wherein the write element is comprised of a first pole layer P1, a second pole layer P2, and a third pole P3.

8. The read/write head of claim 1, further comprising a read element.

9. A write element for use in a read/write head having an air bearing surface to reduce pole tip protrusion, comprising:
    a pole tip region;
    an insulation layer formed adjacent to the pole tip region;
    a coil embedded in the insulation layer contributing to a protrusion force that generates a pole tip protrusion; and
    a layer of thermally expansive material formed over the insulation layer, and recessed from the air bearing surface, that expands in response to heat absorption, causing a rotational moment of force that counteracts the protrusion force thus reducing the pole tip protrusion.

10. The write element of claim 9, wherein the layer of thermally expansive material is made at least in part of photoresist material.

11. The write element of claim 9, wherein the layer of thermally expansive material has a coefficient of thermal expansion that ranges between approximately 5 ppm/K and 100 ppm/K.

12. The write element of claim 9, further comprising a diffuser formed on top of the insulation layer; and
    wherein the layer of thermally expansive material is formed over the diffuser.

13. The write element of claim 9, wherein the write element is comprised of a first pole layer P1, a second pole layer P2, and a third pole P3.

14. A disk drive comprising:
    a base;
    a spindle motor attached to the base;
    a disk positioned on the spindle motor;
    a head stack assembly coupled to the base and comprising:
        an actuator body;
        an actuator arm cantilevered from the actuator body; and
        a read/write head coupled to the actuator arm, and including:
            an air bearing surface;
            a pole tip region;
            an insulation layer formed adjacent to the pole tip region;
            a coil embedded in the insulation layer contributing to a protrusion force that generates a pole tip protrusion; and
            a layer of thermally expansive material formed over the insulation layer, and recessed from the air bearing surface, that expands in response to heat absorption, causing a rotational moment of force that counteracts the protrusion force thus reducing the pole tip protrusion.

15. The disk drive of claim 14, wherein the layer of thermally expansive material is made at least in part of photoresist material.

16. The disk drive of claim 14, wherein the layer of thermally expansive material has a coefficient of thermal expansion that ranges between approximately 5 ppm/K and 100 ppm/K.

17. The disk drive of claim 14, further comprising a write element; and
    wherein the layer of thermally expansive material is formed over substantially the entire surface of the write element.

18. The disk drive of claim 14, further comprising a diffuser formed on top of the insulation layer; and
    wherein the layer of thermally expansive material is formed over the diffuser.

19. The disk drive of claim 18, wherein the diffuser is formed over substantially the entire surface of the write element.

20. The disk drive of claim 14, further comprising a read element.

* * * * *